(12) United States Patent
Harris et al.

(10) Patent No.: US 8,943,066 B2
(45) Date of Patent: Jan. 27, 2015

(54) MANAGEMENT OF DATA GROUPS AND DATA SETS

(75) Inventors: Eric J. Harris, Vail, AZ (US); Franklin E. McCune, Tucson, AZ (US); Miguel A. Perez, Tucson, AZ (US); Ryan J. Wisniewski, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/585,144

(22) Filed: Aug. 14, 2012

(65) Prior Publication Data

US 2014/0052730 A1 Feb. 20, 2014

(51) Int. Cl.
*G06F 17/30* (2006.01)
(52) U.S. Cl.
USPC .......................................................... 707/740

(58) Field of Classification Search
None
See application file for complete search history.

(56) References Cited

U.S. PATENT DOCUMENTS

2010/0185589 A1* 7/2010 Clarke et al. .................. 707/674
2011/0238638 A1   9/2011 Thompson

OTHER PUBLICATIONS z/OS Job Control Language, 5th edition, Gary Deward Brown, 2002, chapter 15 and chapter 19.*
Tivoli Asset Discovery for z/OS, version 7, release 5, Administration Guide and Reference, Apr. 2011.*
IBM Corporation, "Data and storage management on z/OS" [online]. Product No. 5694-A01, Copyright IBM Corporation 2005, 2008, [retrieved on Aug. 14, 2012]. Retrieved from the internet:<URL: http://publib.boulder.ibm.com/infocenter/zos/basics/topic/com.ibm.zos.zdatamgmt/zdatamgmt_book.pdf>.
IBM Corporation, "MVS System Management Facilities (SMF)" [online]. Twenty-second Edition, Apr. 2010, Copyright IBM Corporation 1988, 2009, [retrieved on Aug. 14, 2012]. Retrieved from the internet:<URL: http://publibz.boulder.ibm.com/epubs/pdf/iea2g2a1.pdf> Chapters 1 and 13.
IBM Corporation, "z/OS Concepts" [online]. Product No. 5694-A01, Copyright IBM Corporation 2006, 2010, [retrieved on Aug. 14, 2012]. Retrieved from the internet:<URL: http://publib.boulder.ibm.com/infocenter/zos/basics/topic/com.ibm.zos.zconcepts/zconcepts_book.pdf> Chapters 2-5.

* cited by examiner

*Primary Examiner* — Robert Beausoliel, Jr.
*Assistant Examiner* — Hau H Hoang
(74) *Attorney, Agent, or Firm* — Jinesh Patel; Robert Sullivan (57) ABSTRACT

Embodiments of the present invention provide a system, method, and program product for managing data sets. According to one aspect of the present invention, a data group of one or more related data sets is reorganized. Utilizing one or more specified criteria, data sets that should be cataloged in the data group are identified and cataloged in the data group such that they are arranged in a chronological order and are named with appropriate generation numbers.

20 Claims, 9 Drawing Sheets

| NAME | CREATION DATE/TIME | VOLSERS |
|---|---|---|
| EX.GDG.G0001V00 | 01/01/2012; 15:00 | VOLA01; VOLA02 |
| EX.GDG.G0002V00 | 03/01/2012; 15:00 | VOLD01 |

FIG. 8A

| NAME | CREATION DATE/TIME | VOLSERS |
|---|---|---|
| EX.GDG.G0001V00 | 01/01/2012; 15:00 | VOLA01; VOLA02 |
| EX.GDG.G0002V00 | 02/01/2012; 15:00 | VOLB01 |
| EX.GDG.G0002V00 | 03/01/2012; 15:00 | VOLD01 |
| EX.GDG.G0003V00 | 04/01/2012; 15:00 | VOLC01; VOLC02; VOLC03 |
| EX.GDG.G0003V00.TEMP | 04/02/2012; 15:30 | VOLD01 |

FIG. 8B

| NAME | CREATION DATE/TIME | VOLSERS |
|---|---|---|
| EX.GDG.G0001V00 | 01/01/2012; 15:00 | VOLA01; VOLA02 |
| EX.GDG.G0002V00 | 02/01/2012; 15:00 | VOLB01 |
| EX.GDG.G0003V00 | 03/01/2012; 15:00 | VOLD01 |
| EX.GDG.G0004V00 | 04/01/2012; 15:00 | VOLC01; VOLC02; VOLC03 |
| EX.GDG.G0005V00 | 04/02/2012; 15:30 | VOLD01 |

MANAGEMENT OF DATA GROUPS AND DATA SETS

TECHNICAL FIELD

The present invention relates generally to computer systems and, more particularly, to managing groups of data sets on a computer system.

BACKGROUND

On certain computer systems, such as mainframe computer systems, one or more catalogs are typically utilized to store references to data sets (i.e., files) that are stored on the computer system. Such catalogs enable a data set to be referenced by name, without having to specify its precise storage location (i.e., storage path) on the computer system.

Related data sets can typically be cataloged in a group. For example, successive updates or versions of a particular file can be cataloged in a group and arranged in chronological order. Cataloging related data sets in a group permits all data sets within that group to be referenced by a common group name, and can enable a user of the computer system to store, track, and manage large numbers of data sets in an organized manner.

Groups of related data sets can become disorganized in some circumstances. For example, if a system catalog is not available at the time a data set is created, the data set may not be properly cataloged in the group in which it belongs. Similarly, a user may mistakenly misname a data set or group. These circumstances can result in improperly cataloged data sets, uncataloged data sets, and data sets that include duplicative or incorrect names.

Reorganizing a group of data sets such that it includes the appropriate data sets in a proper chronological order can be a tedious and complicated task. For example, improperly cataloged or uncataloged data sets that should be cataloged in a particular group can be difficult to locate on the computer system without knowing their precise storage locations. Also, in environments where data sets are regularly created at scheduled intervals, such as continuous backup operations of critical data, the difficulty of rectifying a disorganized group of data sets can be compounded where new data sets are continuously being created with potentially duplicative or otherwise incorrect names. In addition, on certain computer systems, the sheer number of data sets stored on the computer system can further complicate the task of reorganizing a group of data sets.

SUMMARY

Embodiments of the present invention provide a system, method, and program product for managing data sets. According to one aspect of the present invention, there is provided a computer-implemented method comprising the steps of: receiving a name of a specified data group, wherein one or more data sets are cataloged in the specified data group; identifying a data set having a name that matches, in whole or in part, the name of the specified data group; determining, pursuant to specified criteria, whether the identified data set should be cataloged in the specified data group; responsive to determining that the identified data set should be cataloged in the specified data group, cataloging the identified data set in the specified data group such that the identified data set and all other data sets that are cataloged in the specified data group are arranged in a chronological order; and renaming one or more data sets that are cataloged in the specified data group such that each data set that is cataloged in the specified data group has a name that includes a distinct generation number that corresponds to a position in the chronological order.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable mediums having computer-readable program code embodied thereon.

Any combination of one or more computer-readable media may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention will now be described in detail with reference to the accompanying Figures.

Figure 1:
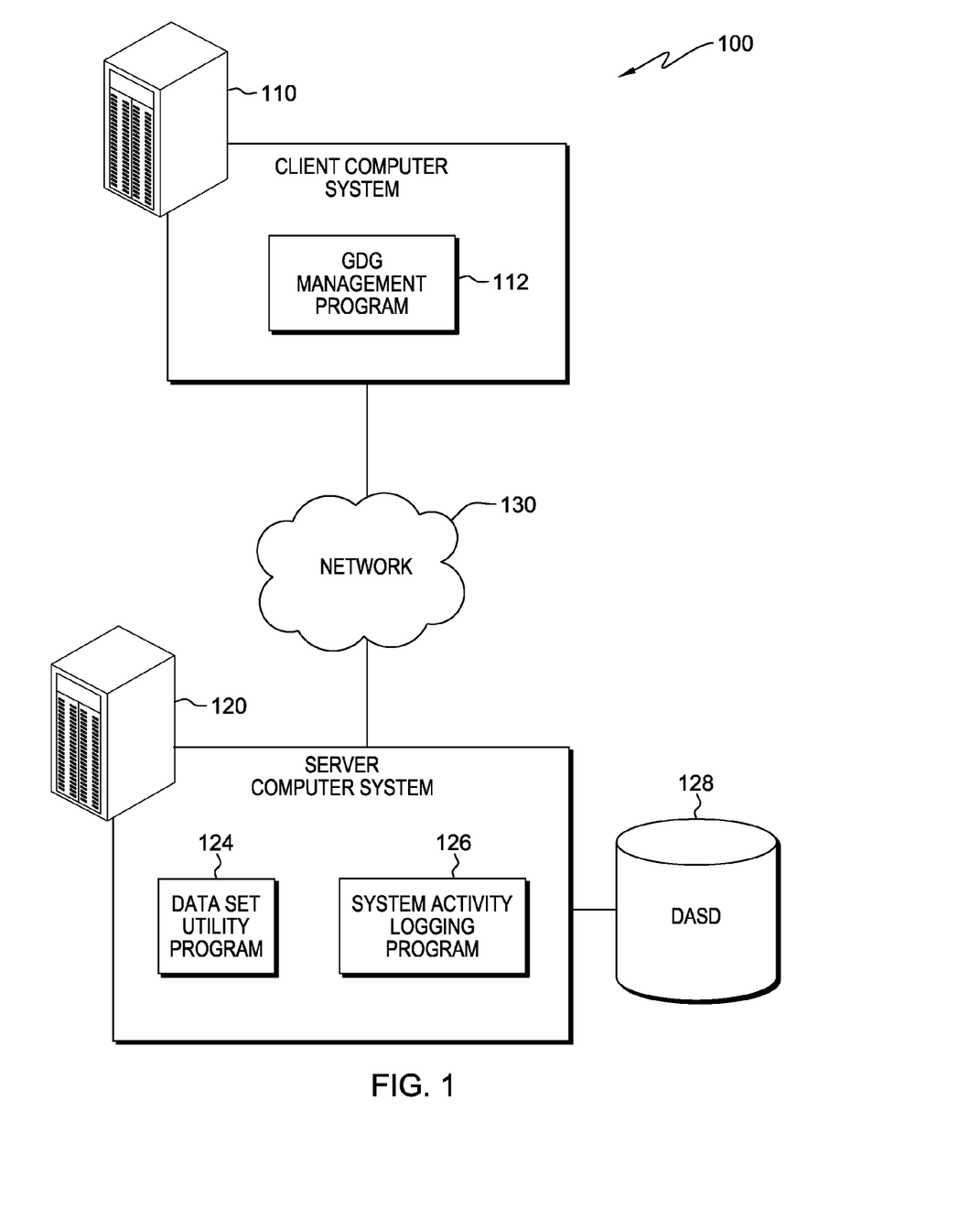
FIG. 1 is a functional block diagram of a data system in accordance with an embodiment of the present invention.

FIG. 1 is a functional block diagram of a data system 100 in accordance with an embodiment of the present invention. Data system 100 includes client computer system 110 and server computer system 120 interconnected by network 130. Client computer system 110 and server computer system 120 can be desktop computers, laptop computers, specialized computer servers, or any other computer systems known in the art. In certain embodiments, client computer system 110 and server computer system 120 represent computer systems utilizing clustered computers and components that each act as a single pool of seamless resources when accessed through network 130. For example, such embodiments may be used in datacenter, cloud computing, storage area network (SAN), and network attached storage (NAS) applications. In certain embodiments, client computer system 110 represents a computer terminal and server computer system 120 represents a mainframe computer system. In general, client computer system 110 and server computer system 120 are representative of any electronic devices or combination of electronic devices capable of executing machine-readable program instructions, as described in greater detail with regard to FIG. 9.

Client computer system 110 includes generation data group (GDG) management program 112. GDG management program 112 enables a user of client computer system 110 to manage generation data groups (GDGs) on server computer system 120 in accordance with embodiments of the present invention. A GDG, as used in this specification, refers to a group of one or more historically related data sets (i.e., files) that are cataloged on server computer system 120. Historically related data sets, referred to herein as generation data sets (GDSs), can contain any data. For example, each GDS cataloged in a GDG can be a generation (i.e., version) of a particular file that is backed up to server computer system 120 each week. In this exemplary embodiment, the name of each GDS corresponds to a GDG (i.e., a GDG base) in which it is cataloged and also includes a generation number. Accordingly, GDSs that are properly cataloged in a GDG can be referenced as a group by utilizing the common GDG name, while a specific GDS in the group (i.e., a particular generation) can also be referenced on the basis of the GDS name, which includes a specific generation number. As described in greater detail with regard to FIGS. 2 through 8, GDG management program 112 enables a user to reorganize a disorganized GDG that may not include the proper GDSs and/or whose GDSs are out of order or misnamed. In addition, GDG management program 112 enables a user to split or merge GDGs.

Server computer system 120 includes data set utility program 124 and system activity logging program 126. In this exemplary embodiment, data set utility program 124 and system activity logging program 126 are operating system utilities. Data set utility program 124 is utilized to create, delete, and modify GDSs and GDGs on server computer system 120, and perform related operations such as GDG and GDS data collection. Data set utility program 124 can be implemented, for example, with access method services (i.e., IDCAMS), as part of the z/OS® operating system available from International Business Machines Corporation of Armonk, N.Y.

System activity logging program 126 is utilized to monitor and record system activities on server computer system 120, including input and output, network activity, and GDS activity such as information pertaining to GDS creation and usage by client computer system 110 and other client computer systems. System activity logging program 126 can be implemented, for example, with the System Management Facility (SMF), as part of the z/OS® operating system available from International Business Machines Corporation of Armonk, N.Y.

Data set utility program 124 and system activity logging program 126 can be invoked by, and communicate with, GDG management program 112 via network 130. For example, GDG management program 112 can issue instructions to data set utility program 124 to create, delete, and modify GDSs and GDGs on server computer system 120 utilizing the Job Control Language (JCL) and/or an alternative environment such as the Time Sharing Option (TSO), as part of the z/OS® operating system available from International Business Machines Corporation of Armonk, N.Y.

Direct access storage disk (DASD) 128 is utilized by server computer system 120 to store GDSs and other data. DASD 128 may be, for example, one or more Advanced Technology Attachment (ATA), Serial ATA (SATA), Small Computer System Interface (SCSI), or Serial Attached SCSI (SAS) compatible hard disk drives. DASD 128 may be implemented with a plurality of such hard disk drives in different configurations, such as, for example, as independent hard disk drives or as a plurality of hard disk drives in a redundant array of independent disks (RAID). DASD 128 can also have one or more logical volumes in different configurations. In general, DASD 128 can be implemented with any storage media known in the art and any database architecture known in the art.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between client computer system 110 and server computer system 120 in accordance with a desired embodiment of the invention.

It should be understood that, for illustrative purposes, FIG. 1 does not show other computer systems and elements which may be present when implementing embodiments of the present invention. For example, while FIG. 1 shows a single client computer system 110, data group management system can also include additional client computer systems 110 that access and utilize server computing system 120.

Figure 2:
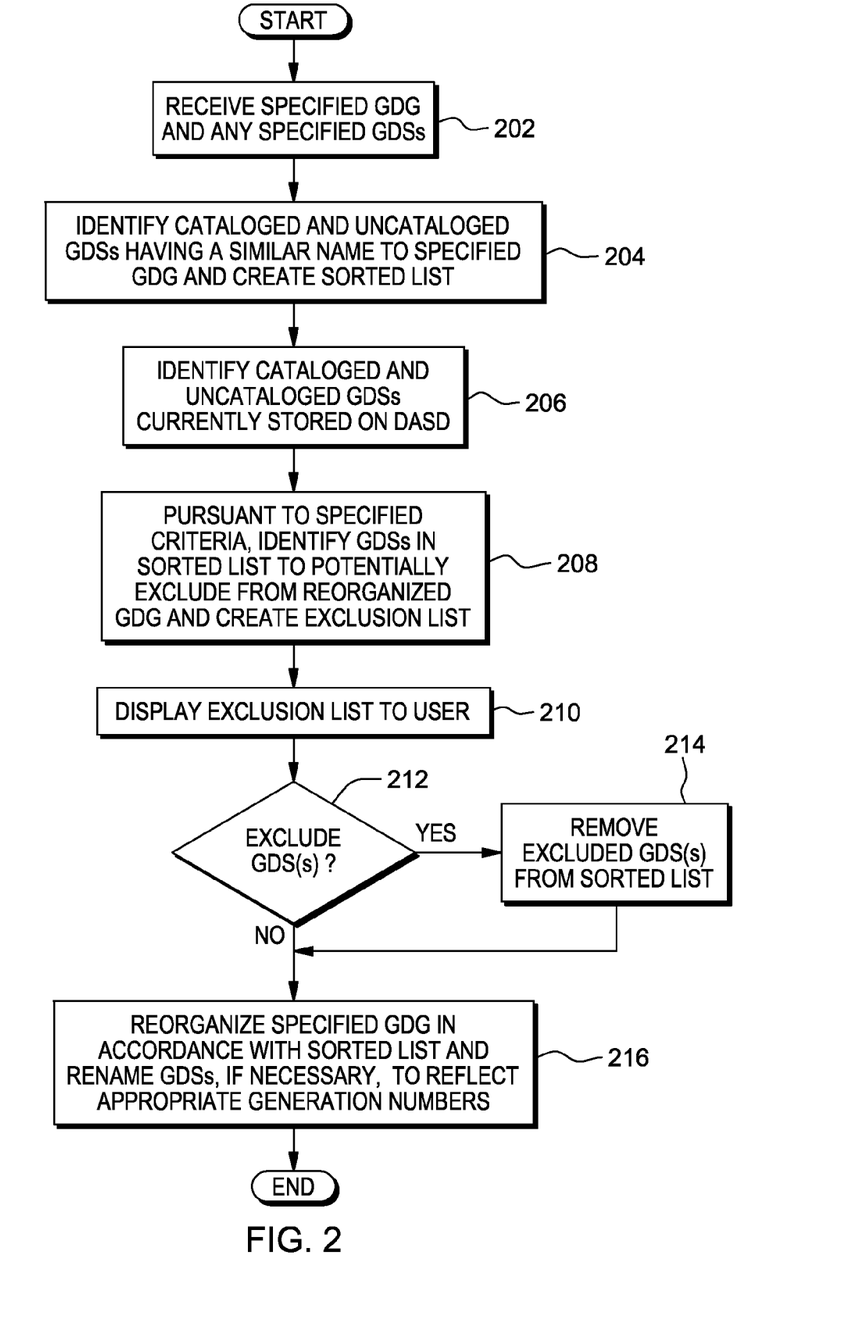
FIG. 2 is a flowchart illustrating operational steps for reorganizing a generation data group in accordance with an embodiment of the present invention.

FIG. 2 is a flowchart illustrating operational steps for reorganizing a GDG in accordance with an embodiment of the present invention. In step 202, GDG management program 112 receives a specified GDG and any specified GDSs. In this exemplary embodiment, a user of client computer system 110 specifies a GDG to reorganize by entering the GDG name. The user can also optionally specify particular GDSs that are not cataloged in the GDG but which the user wishes to include in the reorganized GDG. For example, the user may be aware of and specify one or more GDSs that were mistakenly cataloged in a different GDG when they should have been cataloged in the specified GDG. The user may also specify one or more GDSs that were purposefully given alternative names to avoid confusion. For example, in a continuous-activity environment in which data system 100 is utilized to create GDSs at regular intervals, the difficulty of resolving a disorganized GDG can be compounded if newly created GDSs are continually being cataloged in the GDG with duplicative or otherwise incorrect generation numbers. In such a scenario, the user may wish to configure newly created GDSs to be named with a system mask, thereby affording the user an opportunity to rectify the disorganized GDG without those newly created GDSs being cataloged in the GDG, but while still permitting the GDSs to be created at the regularly-scheduled intervals and later be identified for cataloging in the GDG.

In step 204, GDG management program 112 identifies cataloged and uncataloged GDSs that have a similar name to the specified GDG and creates a sorted list according to the creation date and time of the GDSs. That is, GDG management program 112 identifies and creates a sorted list of all GDSs on server computer system 120 that have a similar name to the specified GDG and therefore, potentially, should be cataloged in the specified GDG. Such GDSs may include, for example, GDSs that are properly cataloged in the specified GDG, GDSs that were improperly cataloged in a different GDG (e.g., a user made a mistake when manually specifying a GDG during creation of the GDS), and GDSs that were not cataloged at all (e.g., during creation of the GDS, a master catalog for data system 100 was unavailable). Operational steps for identifying such GDSs and creating the sorted list are discussed in greater detail with regard to FIG. 3.

In step 206, GDG management program 112 identifies cataloged and uncataloged GDSs that are currently stored on DASD 128. Again, such GDSs may include properly cataloged GDSs, improperly cataloged GDSs, and uncataloged GDSs. In this exemplary embodiment, GDG management program 112 identifies cataloged and uncataloged GDSs currently stored on DASD 128 by querying data set utility program 124. For example, in embodiments where data set utility program 124 is implemented with IDCAMS, GDG management program 112 utilizes the DCOLLECT function (DFSMS Data Collection Facility) of IDCAMS to identify GDSs currently stored on DASD 128, including names of the GDSs and the volume serial numbers of the volumes on which they are stored.

In step 208, pursuant to specified criteria, GDG management program 112 analyzes the GDSs in the sorted list to identify and create an exclusion list of GDSs to potentially exclude from the reorganized GDG. As discussed in greater detail with regard to FIG. 4, the user can customize and specify a variety of criteria, such as, for example, adding to the exclusion list GDSs that are not currently stored on DASD 128 and/or GDSs that do not comport with a pattern of GDSs in the specified GDG that has been detected by GDG management program 112. In this way, the specified criteria serve to flag certain GDSs in the sorted list that, despite having a similar name to the specified GDG, might not belong in the reorganized GDG and therefore should be excluded. In this embodiment, the user retains the ultimate control over whether GDSs in the exclusion list are actually excluded from the reorganized GDG (in later steps); the GDSs that GDG management program 112 determines should be included in the reorganized GDG (i.e., the GDSs not added to the exclusion list) will be included in the reorganized GDG without further user input.

In step 210, GDG management program 112 displays the exclusion list to the user and, in step 212, GDG management program 112 receives from the user a decision on whether to exclude from the reorganized GDG one or more of the GDSs in the exclusion list. In this exemplary embodiment, the user can select one or more GDSs to exclude on an individual basis. If, in step 212, the user decides to exclude one or more GDSs in the exclusion list, then, in step 214, GDG management program 112 removes from the sorted list the one or more GDSs in the exclusion list that were selected by the user in step 212. If, in step 212, the user decides to not exclude from the reorganized GDG any of the GDSs in the exclusion list (e.g., does not select GDSs for exclusion), then GDG management program 112 does not adjust the sorted list.

In step 216, GDG management program 112 reorganizes the specified GDG in accordance with the sorted list and renames GDSs, if necessary, to reflect their appropriate generation numbers. More specifically, GDG management program 112 issues a series of instructions (e.g., create, add, rename, etc.) to data set utility program 124 such that the specified GDG includes all GDSs that are in the sorted list after step 212 or step 214 is performed, the GDSs are arranged in the same chronological order as in the sorted list (i.e., by creation date and time), and the name of each GDS includes the specified GDG and the correct generation number based on its position in the chronological order. In other embodiments, the user can first simulate reorganization of the specified GDG, in which GDG management program 112 displays for the user the names and chronological order of the GDSs that will be included in the reorganized GDG, prior to actually issuing the instructions. Operational steps for reorganizing the specified GDG in accordance with an embodiment of the present invention are discussed in greater detail with regard to FIG. 5.

Figure 3:
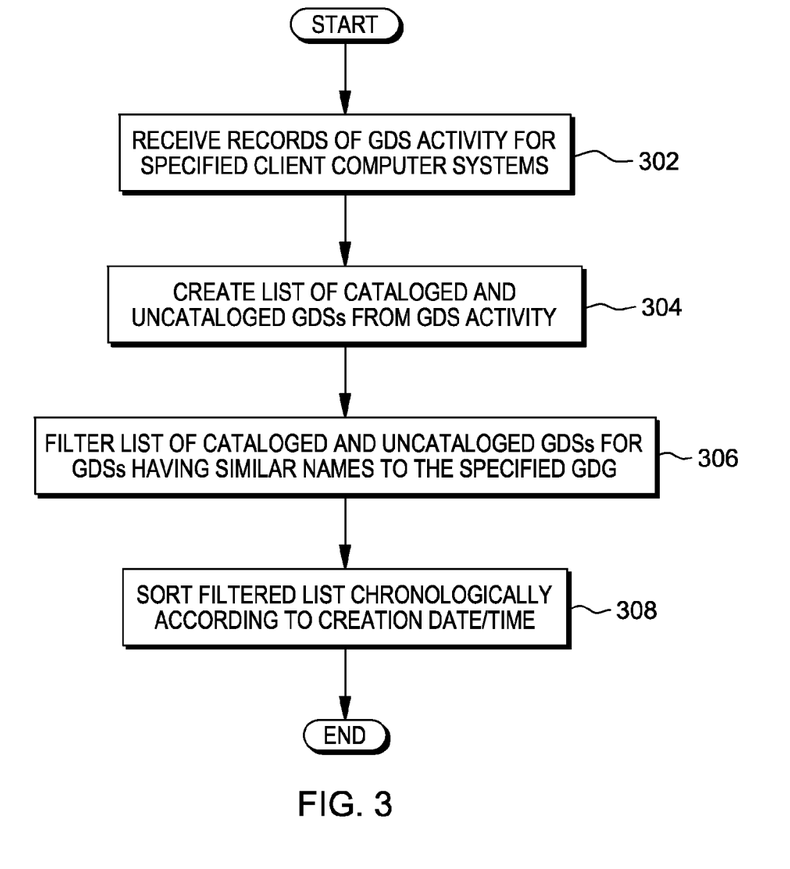
FIG. 3 is a flowchart illustrating operational steps for identifying cataloged and uncataloged data sets during reorganization of a generation data group in accordance with an embodiment of the present invention.

FIG. 3 is a flowchart illustrating operational steps for identifying and creating a sorted list of cataloged and uncataloged GDSs on server computer system 120 during reorganization of a GDG in accordance with an embodiment of the present invention. In this exemplary embodiment, the operational steps of FIG. 3 are performed at step 204 of FIG. 2.

In step 302, GDG management program 112 receives records of GDS activity for one or more specified client computer systems 110. In this exemplary embodiment, the user of GDG management program 112 specifies one or more client computer systems 110 that have access to the specified GDG and its cataloged GDSs, and GDG management program 112 queries system activity logging program 126 for records of all GDS activity associated with those specified client computer systems 110. The records of GDS activity include information pertaining to creation and usage of cataloged and uncataloged GDSs by the specified client computer systems 110. In embodiments where system activity logging program 126 is implemented with SMF, for example, GDG management program 112 can receive SMF records 15, 16, 17, 60, 61, 62, 63, and 66 for the specified client computer systems 110.

In step 304, GDG management program 112 analyzes the received records of GDS activity to identify and create a list of all cataloged and uncataloged GDSs that the specified client computer systems 110 have accessed (i.e., used) and/or created. In this exemplary embodiment, the list includes the names of all such GDSs, as well as their creation dates and times.

In step 306, GDG management program 112 filters the list for GDSs having a name that is similar to that of the specified GDG. That is, GDG management program 112 removes from the list GDSs that do not have a similar name to that of the specified GDG. The degree to which the names must be similar can be specified by the user and can depend on the naming scheme utilized for GDGs and GDSs. In this exemplary embodiment, a discrete portion of the name of each GDS includes the name of a GDG (i.e., a GDG base), and GDG management program 112 identifies GDSs having a similar name to the specified GDG by comparing that portion of each GDS name to the name of the specified GDG and determining a match.

In step 308, GDG management program 112 sorts the filtered list chronologically according to the creation date and time of each GDS, beginning with the oldest GDS.

Figure 4:
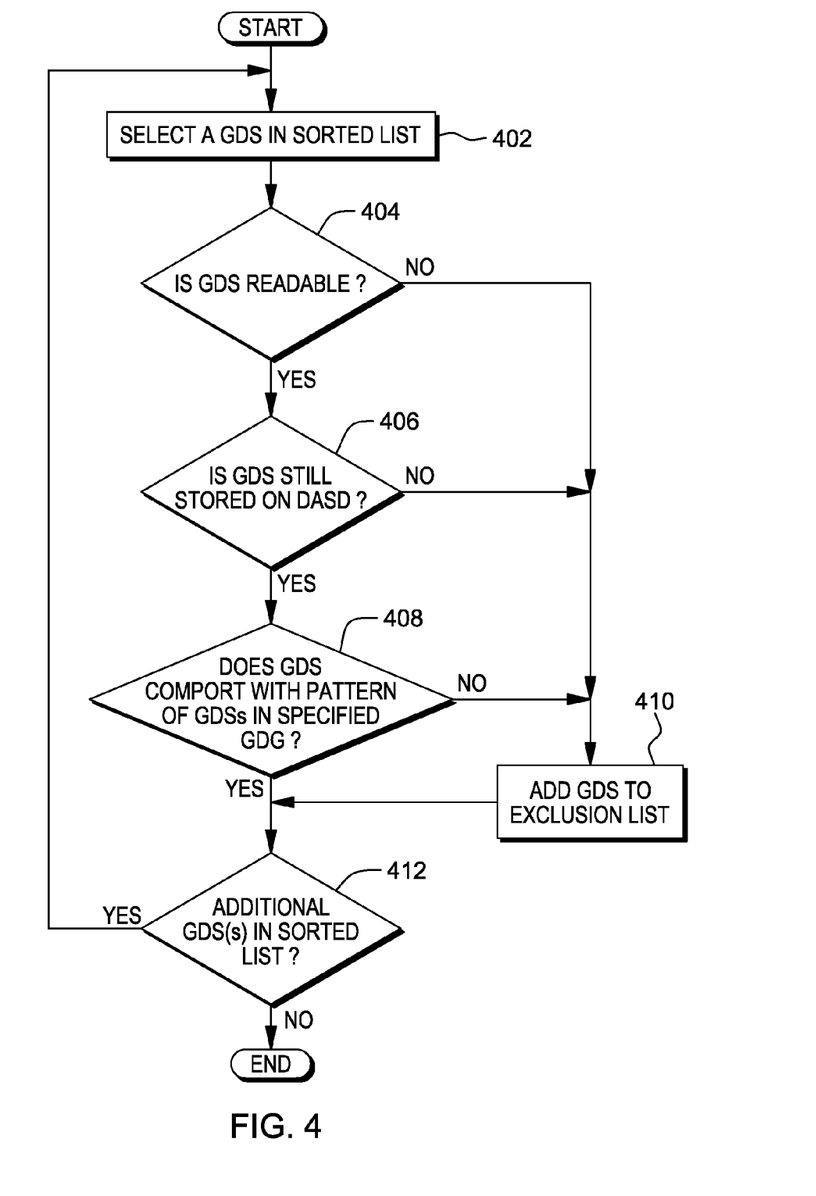
FIG. 4 is a flowchart illustrating operational steps for identifying data sets to potentially exclude from a generation data group during reorganization of the generation data group in accordance with an embodiment of the present invention.

FIG. 4 is a flowchart illustrating operational steps for identifying GDSs to potentially exclude from a GDG during reorganization of the GDG in accordance with an embodiment of the present invention. In this exemplary embodiment, the operational steps of FIG. 4 are performed at step 208 of FIG. 2, and include three specified criteria (i.e., steps 404, 406, and 408).

In step 402, GDG management program 112 selects a GDS in the sorted list (i.e., the sorted list created in step 204 of FIG. 2). In step 404, GDG management program 112 determines whether the selected GDS is readable, as opposed to being an empty data set. If, in step 404, GDG management program 112 determines that the selected GDS is not readable, then, in step 410, GDG management program 112 adds the selected GDS to an exclusion list.

If, in step 404, GDG management program 112 determines that the selected GDS is readable, then, in step 406, GDG management program 112 determines whether the selected GDS is still stored on DASD 128. In this exemplary embodiment, GDG management program 112 compares the selected GDS to the GDSs identified earlier in step 206 of FIG. 2 to determine whether the selected GDS is still stored on DASD 128. If, in step 406, GDG management program 112 determines that the selected GDS is not stored on DASD 128, then, in step 410, GDG management program 112 adds the selected GDS to the exclusion list.

If, in step 406, GDG management program 112 determines that the selected GDS is still stored on DASD 128, then, in step 408, GDG management program 112 analyzes the GDSs cataloged in the specified GDG to detect one or more patterns, and then determines whether the selected GDS comports with those one or more patterns. In this exemplary embodiment, GDG management program 112 analyzes the creation date and time of each GDS that is cataloged in the specified GDG to detect a pattern, and determines whether the creation date and time of the selected GDS comports with that pattern. For example, if each GDS that is cataloged in the specified GDG has a creation date and time that is approximately one week apart, GDG management program 112 can detect that pattern (i.e., weekly-created GDSs) and determine whether the creation date and time of the selected GDS is also approximately one week apart from one or more of those GDSs.

In other embodiments, GDG management program 112 can also analyze the file attributes of the GDSs that are cataloged in the specified GDG and detect a pattern. For example, if each GDS that is cataloged in the specified GDG has a particular file format and/or block size, GDG management program 112 can detect that pattern and determine whether the selected GDS also has that file format and/or block size.

In other embodiments, GDG management program 112 can analyze job and/or system names associated with each GDS that is cataloged in the specified GDG and detect a pattern. Job and system name information can be obtained from the received records of GDS activity (e.g., SMF 61 records), as previously discussed. For example, if multiple GDSs that are cataloged in the specified GDG were created in a single batch job and are therefore associated with the same job name, GDG management program 112 can detect that pattern and determine whether the selected GDS is also associated with that job name. Similarly, if multiple GDSs that are cataloged in the specified GDG were created by jobs run by the same client computer system 110 or a particular group of such systems, GDG management program 112 can detect that pattern and determine whether the selected GDS is also associated with one of those particular system names.

In general, GDG management program 112 can be utilized to detect any pattern pertaining to the GDSs that are cataloged in the specified GDG and determine whether the selected GDS comports with that pattern.

If, in step 408, GDG management program 112 determines that the selected GDS does not comport with a detected pattern of the GDSs cataloged in the specified GDG, then, in step 410, GDG management program 112 adds the selected GDS to the exclusion list. If, in step 408, GDG management program 112 determines that the selected GDS does comport with an identified pattern of the GDSs cataloged in the specified GDG, then analysis of the selected GDS is complete and, in step 412, GDG management program 112 determines whether there are one or more additional GDSs in the sorted list that have not yet been selected and analyzed.

If, in step 412, GDG management program 112 determines that there are one or more additional GDSs in the sorted list that have not yet been selected and analyzed, then the operational steps repeat back at step 402, and so repeat for each GDS in the sorted list.

Accordingly, in this exemplary embodiment, GDG management program 112 analyzes the sorted list and adds to the exclusion list each GDS that is not readable, not stored on DASD 128, and/or does not comport with a detected pattern of the GDSs cataloged in the specified GDG. The specified criteria can be modified, and criteria can be added and/or removed by the user, to control which GDSs are added to the exclusion list and presented to the user for possible exclusion from the reorganized GDG. In other embodiments, GDG management program 112 can be configured to automatically remove from the sorted list the GDSs that are added to the exclusion list (i.e., automatically exclude those GDSs from the GDG). In each case, GDG management program 112 can potentially increase the speed and efficiency with which the user can identify GDSs that should be included in the reorganized GDG, including where GDSs are improperly cataloged or are not cataloged at all and therefore may not be readily discoverable without knowing the GDS names and/or storage locations on DASD 128.

Figure 5:
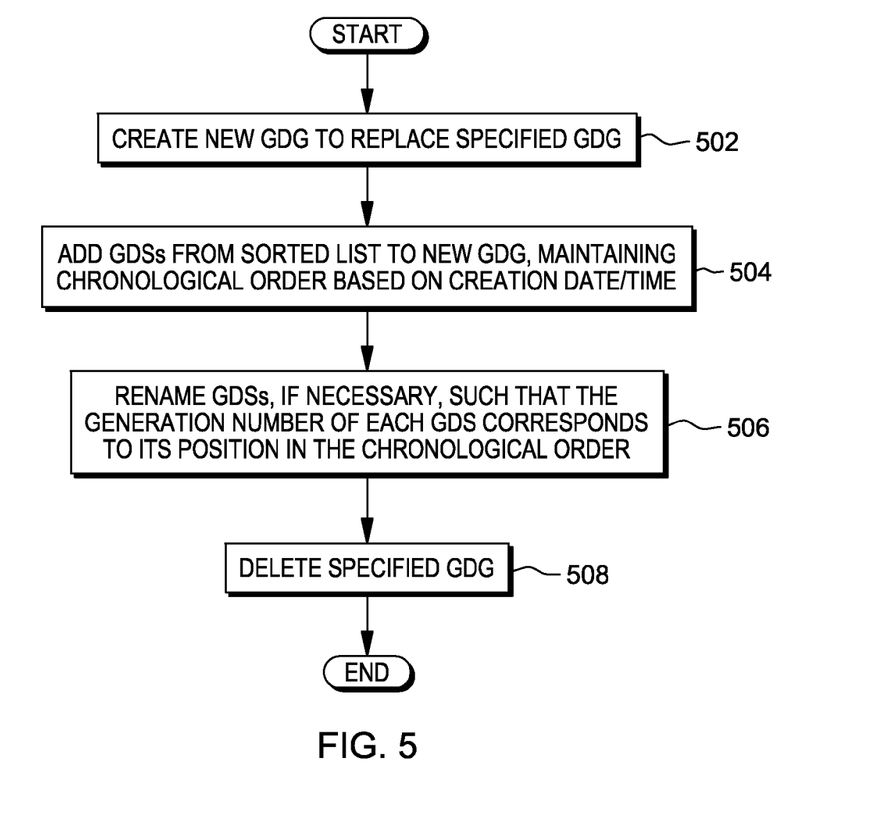
FIG. 5 is a flowchart illustrating operational steps for creating a reorganized generation data group in accordance with an embodiment of the present invention.

FIG. 5 is a flowchart illustrating operational steps for creating a reorganized GDG in accordance with an embodiment of the present invention. In this exemplary embodiment, the operational steps of FIG. 5 are performed at step 216 of FIG. 2.

In step 502, GDG management program 112, via network 130, invokes data set utility program 124 and issues instructions to create a new GDG.

In step 504, GDG management program 112 issues instructions to data set utility program 124 to add (i.e., catalog) each GDS from the sorted list to the new GDG, maintaining the chronological order of the GDSs based on creation date and time. GDG management program 112 can utilize a batch job or issue instructions for each GDS in turn.

In step 506, GDG management program 112, if necessary, issues instructions to data set utility program 124 to rename one or more GDSs such that the name of each GDS includes a distinct generation number that corresponds to its position in the chronological order. For example, as a result of GDSs being improperly cataloged or not cataloged when originally created, the names of the GDSs added to the new GDG may have duplicative or otherwise incorrect generation numbers. In this exemplary embodiment, having established an appropriate chronological order for the GDSs based upon creation date and time, GDG management program 112 issues rename instructions to data set utility program 124 for the necessary GDSs such that the first (i.e., oldest) GDS in the new GDG has the lowest generation number, and each subsequent GDS has a generation number that is incremented by one. An example scenario illustrating, among other things, the renaming of GDSs is discussed with regard to FIGS. 8A through 8C.

In step 508, GDG management program 112 issues instructions to data set utility program 124 to delete the specified GDG.

Accordingly, in this exemplary embodiment, the specified GDG is reorganized by creating a properly organized (i.e., based on the sorted list) replacement GDG of the same name and deleting the original specified GDG. In other embodiments, the specified GDG is reorganized by adding to and/or removing from the specified GDG the appropriate GDSs, without creating a replacement GDG. In each case, the specified GDG is reorganized such that the appropriate GDSs are cataloged in the specified GDG in the appropriate chronological order and with the appropriate generation numbers.

Figure 6:
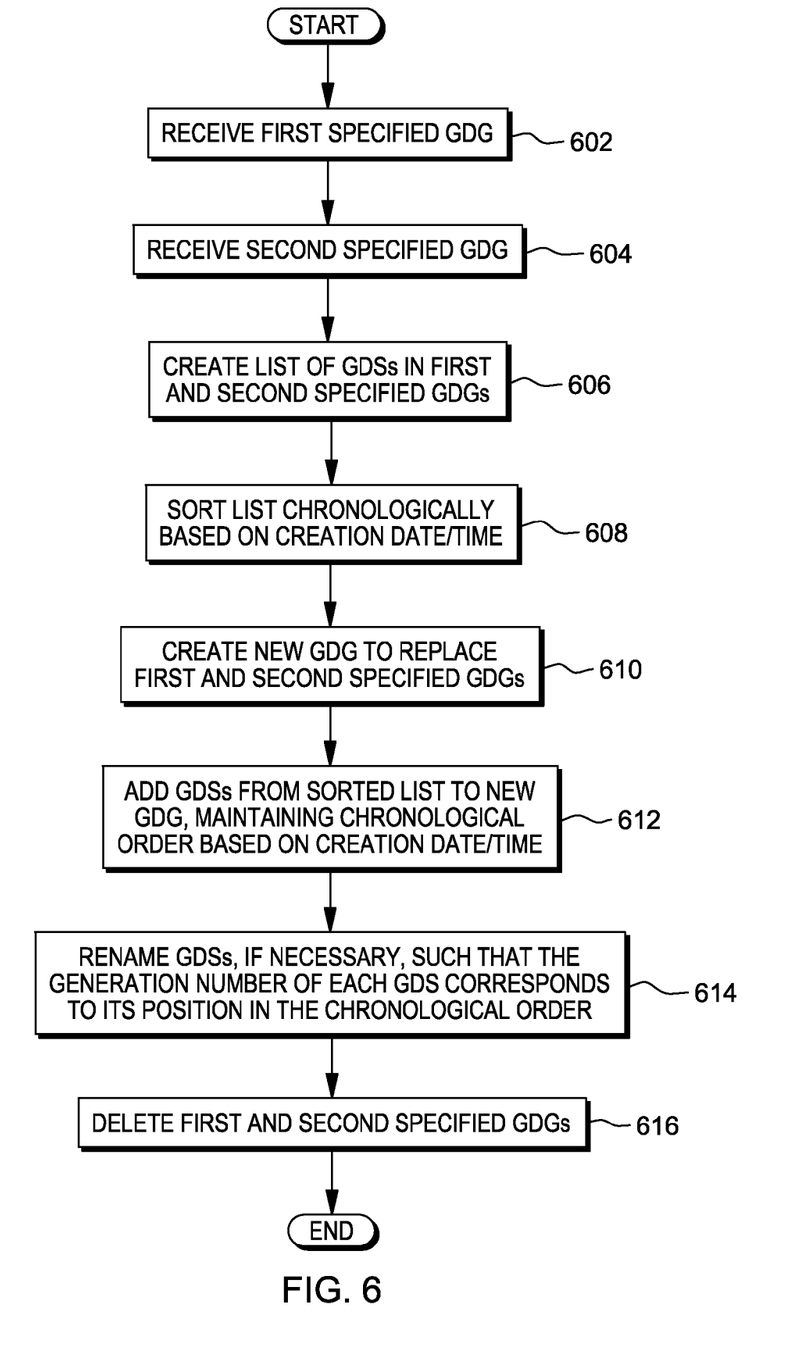
FIG. 6 is a flowchart illustrating operational steps for merging multiple generation data groups into a single generation data group in accordance with an embodiment of the present invention.

FIG. 6 is a flowchart illustrating operational steps for merging multiple GDGs into a single GDG in accordance with an embodiment of the present invention. In this exemplary embodiment, the GDSs of two GDGs are combined to create a single GDG. For example, this embodiment can be useful where a GDS was created while a system catalog was unavailable and therefore resulted in the creation of a new GDG, as opposed to the GDS being properly cataloged in an existing GDG.

In step 602, GDG management program 112 receives a first specified GDG to merge and, in step 604, GDG management program 112 receives a second specified GDG to merge. In this exemplary embodiment, a user of client computer system 110 specifies the first and second GDGs by entering their respective names.

In step 606, GDG management program 112 creates a list of GDSs that are cataloged in the first and second specified GDGs. In this exemplary embodiment, GDG management program 112 creates the list by querying data set utility program 124 for the names and creation dates and times of the GDSs that are cataloged in the first and second specified GDGs. In step 608, GDG management program 112 sorts the list of GDSs chronologically based on creation date and time, as previously discussed.

In step 610, GDG management program 112 invokes data set utility program 124 and issues instructions to create a new GDG.

In step 612, GDG management program 112 issues instructions to data set utility program 124 to add (i.e., catalog) each GDS from the sorted list created in step 606 to the new GDG, maintaining the chronological order of the GDSs based on creation date and time.

In step 614, GDG management program 112, if necessary, issues instructions to data set utility program 124 to rename one or more GDSs in the new GDG such that the name of each GDS includes a distinct generation number that corresponds to its position in the chronological order, as previously discussed.

In step 616, GDG management program 112 issues instructions to data set utility program 124 to delete the first and second specified GDGs.

Figure 7:
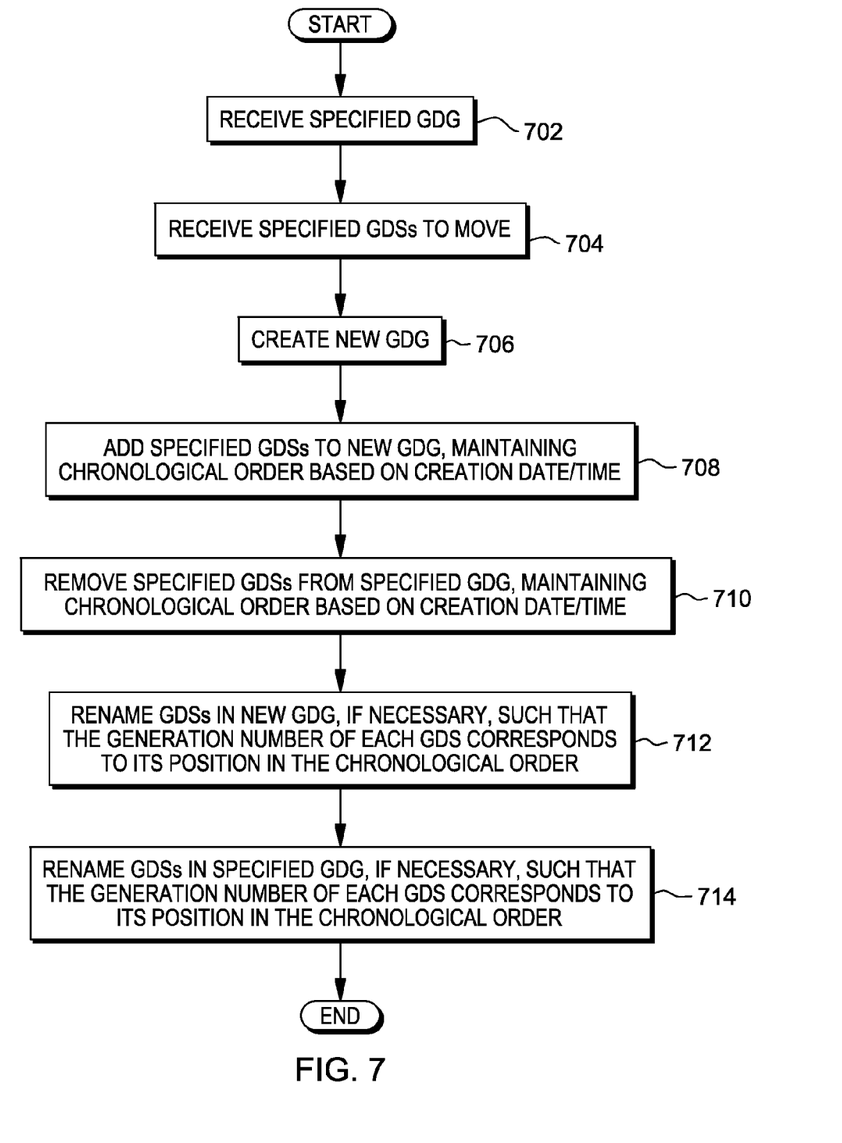
FIG. 7 is a flowchart illustrating operational steps for splitting a generation data group into multiple generation data groups in accordance with an embodiment of the present invention.

FIG. 7 is a flowchart illustrating operational steps for splitting a GDG into multiple GDGs in accordance with an embodiment of the present invention. In this exemplary embodiment, a portion of the GDSs in a first GDG are moved to a second GDG. This embodiment can be useful, for example, where there is a limit to the number of GDSs that can be cataloged in particular GDG.

In step 702, GDG management program 112 receives a specified GDG to split. In this exemplary embodiment, a user of client computer system 110 specifies the GDG by entering the GDG name.

In step 704, GDG management program 112 receives one or more specified GDSs in the specified GDG to move (i.e., to remove from the specified GDG and catalog in a new GDG). In this exemplary embodiment, the user specifies the GDSs by selecting them from a list displayed by GDG management program 112. In other embodiments, GDG management program 112 can identify GDSs to move based on specified criteria. For example, a user can specify that GDSs whose creation date and time fall within a particular range should be moved.

In step 706, GDG management program 112 invokes data set utility program 124 and issues instructions to create a new GDG. In step 708, GDG management program 112 issues instructions to data set utility program 124 to add (i.e., catalog) the specified GDSs to the new GDG, maintaining their existing chronological order based on creation date and time. In this exemplary embodiment, it is presumed that the GDSs in the specified GDG are properly organized by creation date and time.

In step 710, GDG management program 112 issues instructions to data set utility program 124 to remove (i.e., uncatalog) the specified GDSs from the specified GDG, while maintaining the existing chronological order of the remaining GDSs in the specified GDG based on creation date and time. Again, in this exemplary embodiment, it is presumed that the GDSs in the specified GDG are properly organized by creation date and time.

In step 712, GDG management program 112, if necessary, issues instructions to data set utility program 124 to rename one or more GDSs in the new GDG such that the name of each GDS includes a distinct generation number that corresponds to its position in the chronological order. For example, if the oldest four GDSs (e.g., generations 1 through 4) out of ten GDSs in the specified GDG were moved to the new GDG, their generation numbers need not be modified; if the youngest four GDSs (e.g., generations 7 through 10) in the specified GDG were moved to the new GDG, their generation numbers are renamed to reflect that they are the oldest four GDSs (e.g., generations 1 through 4) in the new GDG.

In step 714, GDG management program 112, if necessary, issues instructions to data set utility program 124 to rename the GDSs that remain in the specified GDG such that the generation number of each GDS corresponds to its position in the chronological order. For example, if the oldest four GDSs (e.g., generations 1 through 4) out of ten GDSs in the specified GDG were moved to the new GDG, the remaining six GDSs (e.g., generations 5 through 10) in the specified GDG are renamed to reflect the new chronological order (e.g., generations 1 through 6).

Figure 8A:
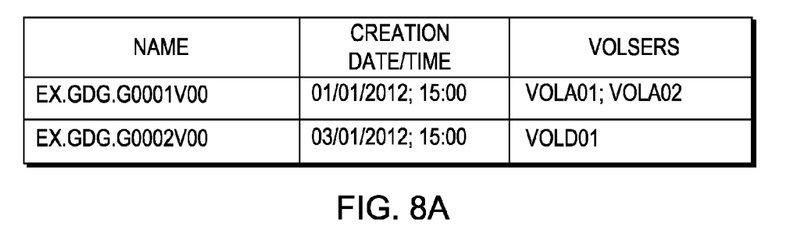
FIGS. 8A through 8C are tables illustrating a hypothetical scenario in which a generation data group is reorganized in accordance with an embodiment of the present invention.
Figure 8B:
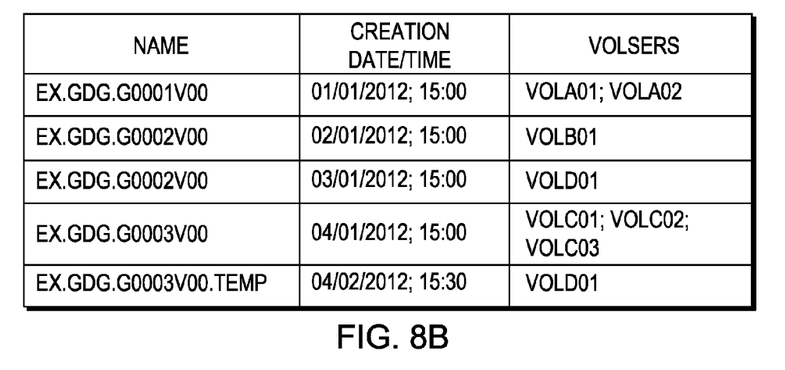
Figure 8C:
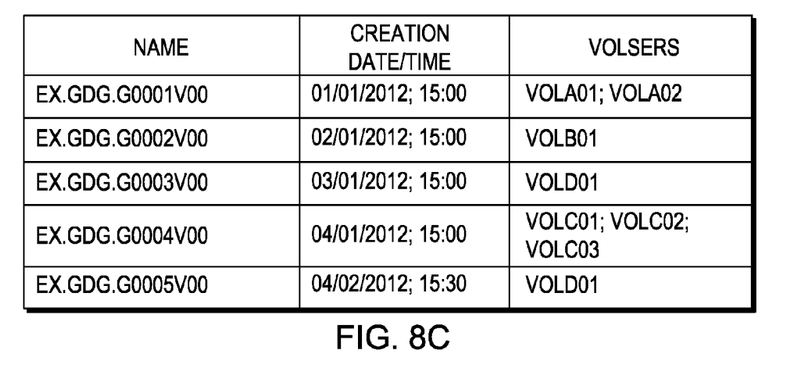

FIGS. 8A through 8C are tables illustrating a hypothetical scenario in which a GDG is reorganized in accordance with the operational steps of FIG. 2. In this example scenario, a user has specified a GDG named "EX.GDG" for reorganization. The "NAME" column of each table includes names of hypothetical GDSs. In this exemplary embodiment, each GDS name includes a GDG name and a generation number (e.g., G0001V00). The "CREATION DATE/TIME" column of each table includes the date and time (i.e., in international standard notation) at which each GDS was created. The "VOLSERS" column of each table includes volume serial numbers of one or more volumes on DASD 128 on which each GDS is stored.

Turning now to FIG. 8A, shown is a table of GDSs that are cataloged in the specified GDG prior to reorganization. That is, these GDSs are already cataloged in the specified GDG when step 202 of FIG. 2 is performed.

Turning now to FIG. 8B, shown is a table of identified cataloged and uncataloged GDSs having a similar name to the specified GDG, sorted chronologically based on creation date and time. In this example, the GDSs included in this table represent the sorted list of GDSs created in step 204 of FIG. 2. The list includes the GDSs that are currently cataloged in the specified GDG (i.e., EX.GDG.G0001V00 and EX.GDG.G0002V00), as well as GDSs that are not cataloged in the specified GDG, but which have a similar name to the specified GDG (i.e., EX.GDG.G0002V00, EX.GDG.G0003V00, and EX.GDG.G0003V00.TEMP). It should be noted that this list includes two GDSs that have the name EX.GDG.G0002V00 (i.e., one created on 2/1/2012 at 15:00 and one created on 3/1/2012 at 15:00). Further, this list includes a GDS that has a system mask (i.e., EX.GDG.G0003V00.TEMP).

Turning now to FIG. 8C, shown is a table of GDSs that are cataloged in the specified GDG after reorganization is complete. In this example, the user has decided to not exclude any GDSs from the sorted list. Accordingly, all GDSs in the sorted list have been added to the replacement GDG, maintaining the chronological order based on creation date and time. The GDSs have also been renamed, where necessary, such that the generation number of each GDS corresponds to its position in the chronological order: EX.GDG.G0001V00 was not renamed; EX.GDG.G0002V00 created on 2/1/2012 at 15:00 was not renamed; EX.GDG.G0002V00 created on 3/1/2012 at 15:00 was renamed to EX.GDG.G0003V00; EX.GDG.G0003V00 was renamed to EX.GDG.G0004V00; and EX.GDG.G0003V00.TEMP was renamed to EX.GDG.G0005V00 to both reflect its proper generation number and remove the system mask.

Figure 9:
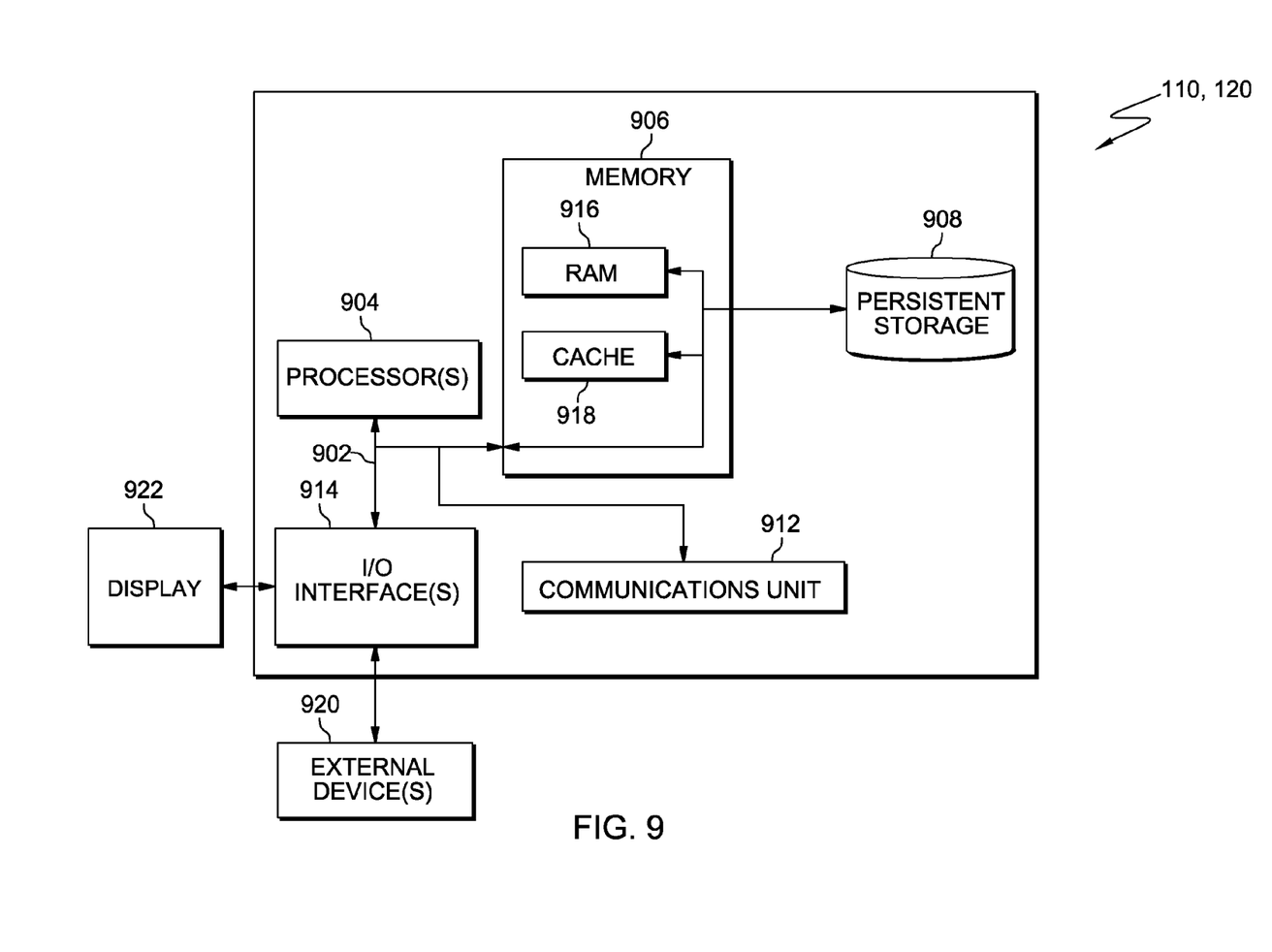
FIG. 9 is a block diagram of internal and external components of the computer systems of FIG. 1 in accordance with an embodiment of the present invention.

FIG. 9 is a block diagram of internal and external components of client computer system 110 and server computer system 120 in accordance with an embodiment of the present invention. It should be appreciated that FIG. 9 provides only an illustration of one implementation and does not imply any limitations with regard to the environments in which different embodiments may be implemented. In general, the components illustrated in FIG. 9 are representative of any electronic device capable of executing machine-readable program instructions. Examples of computer systems, environments, and/or configurations that may be represented by the components illustrated in FIG. 9 include, but are not limited to, personal computer systems, server computer systems, thin clients, thick clients, laptop devices, multiprocessor systems, microprocessor-based systems, network PCs, minicomputer systems, mainframe computer systems, and distributed cloud computing environments that include any of the above systems or devices.

Client computer system 110 and server computer system 120 each include one or more buses 902, which provide for communications between one or more processors 904, memory 906, persistent storage 908, communications unit 912, and one or more input/output (I/O) interfaces 914.

Memory 906 and persistent storage 908 are examples of computer-readable storage media. Computer-readable storage media are capable of storing information such as data, program code in functional form, and/or other suitable information on a temporary basis and/or permanent basis. One or more operating systems and GDG management program 112 on client computer system 110, and one or more operating systems, data set utility program 124, and system activity logging program 126 on server computer system 120, are stored in their respective persistent storage 908 for execution and/or access by one or more of the respective processors 904 via one or more memories of memory 906.

Memory 906 can include one or more random access memories (RAM) 916, cache memory 918, or any other suitable volatile or non-volatile storage medium. In the embodiment illustrated in FIG. 9, persistent storage 908 is a magnetic disk storage medium of a hard drive. Alternatively, persistent storage 908 can be a semiconductor storage medium such as ROM, EPROM, flash memory or any other computer-readable storage medium that can store a computer program and digital information. The media used by persistent storage 908 can also be removable. For example, a removable hard drive can be used for persistent storage 908. Other examples include optical or magnetic disks, thumb drives, or smart cards that are inserted into a drive for transfer onto another storage medium that is also a part of persistent storage 908. With respect to server computer system 120, DASD 128 can serve, in whole or in part, as persistent storage 908, or can be implemented separately from persistent storage 908.

Communications unit 912 provides for communications with other computer systems or devices via a network, such as network 130. In this exemplary embodiment, communications unit 912 includes network adapters or interfaces such as a TCP/IP adapter cards, wireless Wi-Fi interface cards, or 3G or 4G wireless interface cards or other wired or wireless communication links. The network can comprise copper wires, optical fibers, wireless transmission, routers, firewalls, switches, gateway computers and/or edge servers. Software and data used to practice embodiments of the present invention can be downloaded to client computer system 110 and/or server computer system 120 through communications unit 912 (e.g., via the Internet, a local area network or other wide area network). From communications unit 912, the software and data can be loaded onto persistent storage 908.

One or more I/O interfaces 914 allow for input and output of data with other devices that may be connected to client computer system 110 and/or server computer system 120. For example, I/O interface 914 can provide a connection to one or more external devices 920 such as a keyboard, computer mouse, touch screen, virtual keyboard, touch pad, pointing device, or other human interface devices. With respect to server computer system 120, external devices 920 can also include DASD 128. I/O interface 914 also connects to display 922.

Display 922 provides a mechanism to display data to a user and can be, for example, a computer monitor. Alternatively, display 922 can be an incorporated display and may also function as a touch screen.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the present invention has been presented for purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A computer-implemented method for managing data sets, the computer-implemented method comprising the steps of:
   receiving a name of a specified data group, wherein one or more data sets are cataloged in the specified data group;
   identifying a data set having a name that matches, in whole or in part, the name of the specified data group;
   determining, pursuant to specified criteria, whether the identified data set should be cataloged in the specified data group, wherein determining, pursuant to specified criteria, whether the identified data set should be cataloged in the specified data group includes at least:
      determining whether the identified data set is readable and currently exists in storage;
      determining whether the identified data set comports with one or more patterns of the specified data group; and
      responsive to determining that the identified data set does not comport with one or more patterns of the specified data group, adding the identified data set to an exclusion list, displaying the exclusion list to a user, and receiving input from the user related to whether the identified data set should be cataloged in the specified data group;
   responsive to determining that the identified data set should be cataloged in the specified data group, cataloging the identified data set in the specified data group such that the identified data set and all other data sets that are cataloged in the specified data group are arranged in a chronological order; and
   renaming one or more data sets that are cataloged in the specified data group such that each data set that is cataloged in the specified data group has a name that includes a distinct generation number that corresponds to a position in the chronological order.

2. The computer-implemented method of claim 1, wherein the step of identifying a data set having a name that matches, in whole or in part, the name of the specified data group comprises the steps of:
   receiving one or more records of data set activity; and
   analyzing the received one or more records of data set activity to identify a data set having a name that matches, in whole or in part, the name of the specified data group.

3. The computer-implemented method of claim 1, wherein the step of determining, pursuant to specified criteria, whether the identified data set should be cataloged in the specified data group further comprises the steps of:
   analyzing the one or more data sets that are cataloged in the specified data group to detect a pattern; and
   determining whether the identified data set comports with the pattern.

4. The computer-implemented method of claim 3, wherein the pattern pertains to a creation date and time of each of the one or more data sets that are cataloged in the specified data group.

5. The computer-implemented method of claim 3, wherein the pattern pertains to a file attribute of each of the one or more data sets that are cataloged in the specified data group.

6. The computer-implemented method of claim 3, wherein the pattern pertains to a job or system name associated with each of the one or more data sets that are cataloged in the specified data group.

7. The computer-implemented method of claim 1, wherein determining, pursuant to specified criteria, whether the identified data set should be cataloged in the specified data group, further comprises:
   determining that the identified data set has a name that matches, in whole or in part, a name of a data set contained on the exclusion list; and
   determining that the identified data set should not be catalogued in the specified data group.

8. A computer system for managing data sets, the computer system comprising:
   one or more processors, one or more computer-readable memories, one or more computer-readable storage media, and program instructions stored on at least one of the one or more computer-readable storage media for execution by at least one of the one or more processors via at least one of the one or more computer-readable memories, the program instructions comprising:
   program instructions to receive a name of a specified data group, wherein one or more data sets are cataloged in the specified data group;
   program instructions to identify a data set having a name that matches, in whole or in part, the name of the specified data group;
   program instructions to determine, pursuant to specified criteria, whether the identified data set should be cataloged in the specified data group, wherein the program instructions to determine, pursuant to specified criteria, whether the identified data set should be cataloged in the specified data group includes at least:
       program instructions to determine whether the identified data set is readable and currently exists in storage;
       program instructions to determine whether the identified data set comports with one or more patterns of the specified data group; and
       program instructions to, responsive to determining that the identified data set does not comport with one or more patterns of the specified data group, add the identified data set to an exclusion list, display the exclusion list to a user, and receive input from the user related to whether the identified data set should be cataloged in the specified data group;
   program instructions to, responsive to determining that the identified data set should be cataloged in the specified data group, catalog the identified data set in the specified data group such that the identified data set and all other data sets that are cataloged in the specified data group are arranged in a chronological order; and
   program instructions to rename one or more data sets that are cataloged in the specified data group such that each data set that is cataloged in the specified data group has a name that includes a distinct generation number that corresponds to a position in the chronological order.

9. The computer system of claim 8, wherein the program instructions to determine, pursuant to specified criteria, whether the identified data set should be cataloged in the specified data group further comprise:
   program instructions to receive one or more records of data set activity; and
   program instructions to analyze the received one or more records of data set activity to identify a data set having a name that matches, in whole or in part, the name of the specified data group.

10. The computer system of claim 8, wherein the program instructions to determine, pursuant to specified criteria, whether the identified data set should be cataloged in the specified data group further comprise:
    program instructions to analyze the one or more data sets that are cataloged in the specified data group to detect a pattern; and
    program instructions to determine whether the identified data set comports with the pattern.

11. The computer system of claim 10, wherein the pattern pertains to a creation date and time of each of the one or more data sets that are cataloged in the specified data group.

12. The computer system of claim 10, wherein the pattern pertains to a file attribute of each of the one or more data sets that are cataloged in the specified data group.

13. The computer system of claim 8, wherein the program instructions to determine, pursuant to specified criteria, whether the identified data set should be cataloged in the specified data group, further comprises:
    program instructions to determine that the identified data set has a name that matches, in whole or in part, a name of a data set contained on the exclusion list; and
    program instructions to determine that the identified data set should not be catalogued in the specified data group.

14. A computer program product for managing data sets, the computer program product comprising:
    one or more computer-readable storage media and program instructions stored on at least one of the one or more computer-readable storage media, the program instructions comprising:
    program instructions to receive a name of a specified data group, wherein one or more data sets are cataloged in the specified data group;
    program instructions to identify a data set having a name that matches, in whole or in part, the name of the specified data group;
    program instructions to determine, pursuant to specified criteria, whether the identified data set should be cataloged in the specified data group, wherein the program instructions to determine, pursuant to specified criteria, whether the identified data set should be cataloged in the specified data group includes at least:
        program instructions to determine whether the identified data set is readable and currently exists in storage;
        program instructions to determine whether the identified data set comports with one or more patterns of the specified data group; and
        program instructions to, responsive to determining that the identified data set does not comport with one or more patterns of the specified data group, add the identified data set to an exclusion list, display the exclusion list to a user, and receive input from the user related to whether the identified data set should be cataloged in the specified data group;
    program instructions to, responsive to determining that the identified data set should be cataloged in the specified data group, catalog the identified data set in the specified data group such that the identified data set and all other data sets that are cataloged in the specified data group are arranged in a chronological order; and
    program instructions to rename one or more data sets that are cataloged in the specified data group such that each data set that is cataloged in the specified data group has a name that includes a distinct generation number that corresponds to a position in the chronological order.

15. The computer program product of claim 14, wherein the program instructions to determine, pursuant to specified criteria, whether the identified data set should be cataloged in the specified data group further comprise:
   program instructions to receive one or more records of data set activity; and
   program instructions to analyze the received one or more records of data set activity to identify a data set having a name that matches, in whole or in part, the name of the specified data group.

16. The computer program product of claim 14, wherein the program instructions to determine, pursuant to specified criteria, whether the identified data set should be cataloged in the specified data group further comprise:
   program instructions to analyze the one or more data sets that are cataloged in the specified data group to detect a pattern; and
   program instructions to determine whether the identified data set comports with the pattern.

17. The computer program product of claim 16, wherein the pattern pertains to a creation date and time of each of the one or more data sets that are cataloged in the specified data group.

18. The computer program product of claim 16, wherein the pattern pertains to a file attribute of each of the one or more data sets that are cataloged in the specified data group.

19. The computer program product of claim 16, wherein the pattern pertains to a job or system name associated with each of the one or more data sets that are cataloged in the specified data group.

20. The computer program product of claim 14, wherein the program instructions to determine, pursuant to specified criteria, whether the identified data set should be cataloged in the specified data group, further comprises:
   program instructions to determine that the identified data set has a name that matches, in whole or in part, a name of a data set contained on the exclusion list; and
   program instructions to determine that the identified data set should not be catalogued in the specified data group.

* * * * *